July 28, 1931. W. N. BOOTH 1,816,172
LUBRICANT PROTECTING STRUCTURE FOR INTERNAL BRAKES OF VEHICLE WHEELS
Filed March 7, 1927
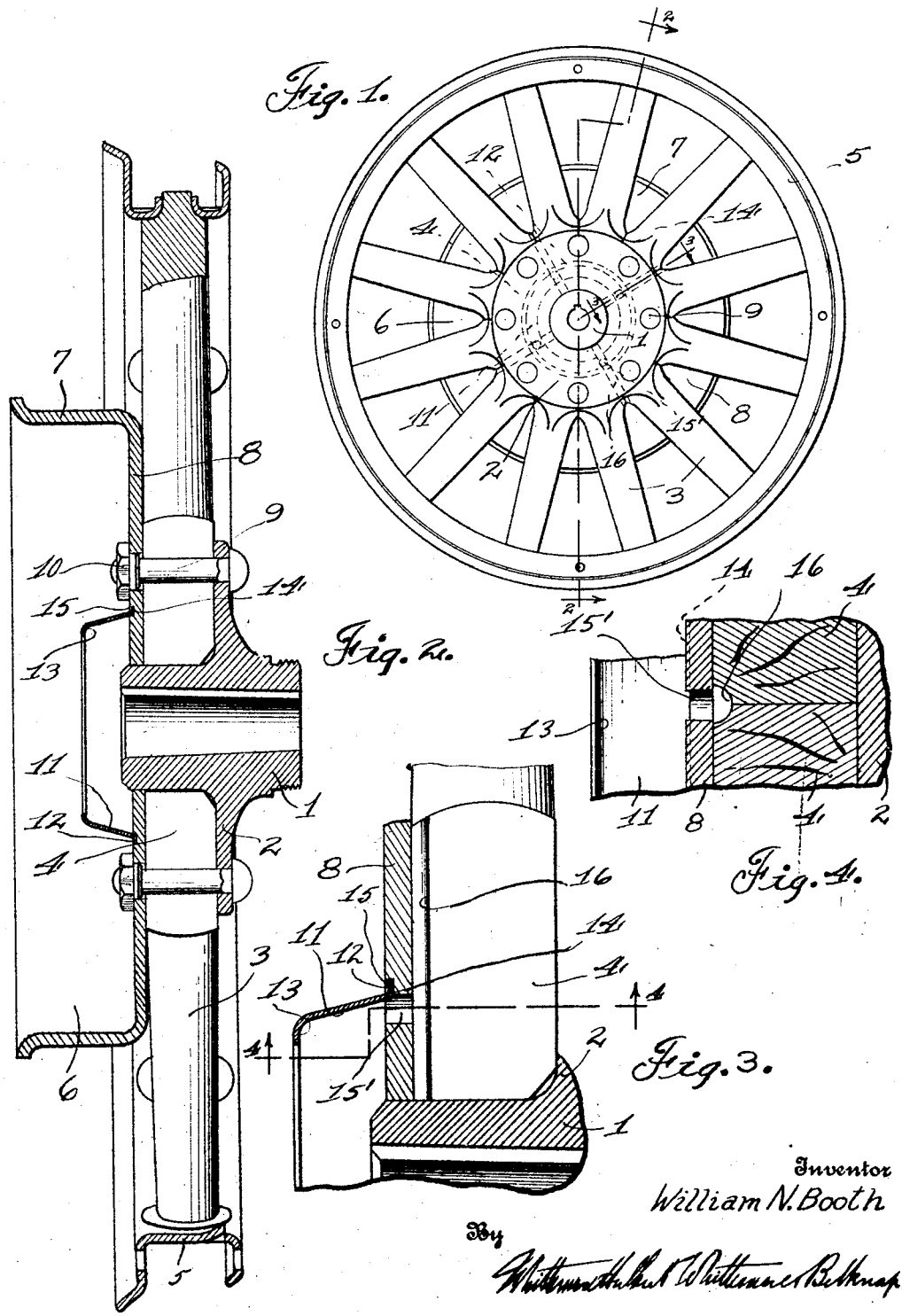
Inventor
William N. Booth
By
Attorney's Patented July 28, 1931

1,816,172

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

LUBRICANT PROTECTING STRUCTURE FOR INTERNAL BRAKES OF VEHICLE WHEELS

Application filed March 7, 1927. Serial No. 173,534.

The invention relates to vehicle wheels and refers more particularly to vehicle wheels having brake drums for use with internal brakes. One of the objects of the invention is to provide an improved arrangement for protecting the internal brake and brake flange from lubricant discharged from the wheel hub. Another object is to mount the lubricant collecting means independently of the means for securing the brake drum to the wheel so that a tight joint between the collecting means and the brake drum may be assured. Further objects of the invention reside in the novel features of construction and combinations and arrangements of parts as more fully hereinafter set forth.

In the drawings:—

Figure 1 is a front elevation of a vehicle wheel embodying my invention;

Figures 2 and 3 are cross sections respectively on the lines 2—2 and 3—3 of Figure 1;

Figure 4 is a cross section on the line 4—4 of Figure 3.

In the present instance I have shown my invention embodied in a wooden spoked wheel in which 1 is the hub having the radial fixed flange 2. 3 are the wooden spokes forming at their inner ends the hub section 4 and 5 is the rim at the outer ends of the spokes in the nature of a felly. 6 is the brake drum having the brake flange 7 adapted for use with an internal brake. This brake drum has the web 8 which is secured against the rear side of the hub section 4 by means of the bolts 9 and the nuts 10, the bolts also extending through the fixed flange 2.

For the purpose of protecting the internal brake as well as the brake flange from lubricant which might be discharged from the wheel hub or the adjacent end of the axle housing, I have provided means between the rear end of the wheel hub and the internal brake and the brake flange for intercepting the lubricant and I have also provided means for receiving this lubricant and conducting the same outside the brake drum. In detail, 11 is a frusto-conical ring preferably formed of sheet metal and located between the rear end of the wheel hub 1 and the internal brake and the brake flange 7 and extending rearwardly beyond the rear end of the wheel hub. This ring has the transverse outwardly extending annular flange 12 at its front edge and the transverse inwardly extending annular flange 13 at its rear edge, the latter being of smaller diameter than the former but of sufficient diameter for the passage of the axle housing or steering spindle. The rear face of the web 8 of the brake drum is provided with the annular channel 14 which is located inwardly of the bolts 9 and nuts 10 for securing the brake drum to the wheel. This channel has a width to slidably receive the annular flange 12 of the ring and its outer wall may be struck in at peripherally spaced points 15 after the annular flange is in place to rigidly secure the ring to the web of the brake drum. To assure sealing the joint between the oil collecting ring and the web of the brake drum the outwardly extending annular flange of the ring may be dipped into shellac prior to being inserted into the channel in the brake drum web, or shellac may be brushed upon the walls of the channel.

For conducting the lubricant outside the brake drum after this lubricant has been collected by the ring, I have provided the transverse openings 15′ in the web of the brake drum adjacent to and preferably opening into the inner edge of the channel 14. I have also provided passages between the hub section 4 and the brake drum web 8, which passages register with the transverse openings 15′ and are open at their outer ends. In detail, the rear face of the hub section 4 is provided with the outwardly extending or radial grooves 16 which are preferably formed in the adjacent corners of the inner bevelled ends of the spokes forming the hub section and which are closed by the brake drum web. Suitable lubricant resisting paint may be used upon the walls forming the grooves to protect the wood.

From the above description, it will be readily seen that I have provided a simple construction for protecting the internal brake and the brake flange from lubricant which might be discharged from either the hub or the end of the axle housing. It will also be seen that the construction is such that the joint between the oil collecting ring and the brake drum web is tight and remains tight owing principally to the fact that the ring is mounted independently of the means for securing the brake drum to the wheel.

What I claim as my invention is:

1. In a vehicle wheel, the combination with a hub, a brake drum having a web, and a brake flange for use with an internal brake, and securing means for said brake drum extending through said web, said web having in its rear face an annular groove located between said hub and brake flange, of a lubricant collecting ring having a transverse outwardly extending annular flange rigidly secured in said annular groove, said ring extending rearwardly beyond the rear end of said hub, and means for conducting lubricant collected by said ring to a point outside said brake drum, said means including apertures in said web opening into the space enclosed by said ring.

2. The combination with a vehicle wheel, of a brake drum secured thereto, one of said members having an outwardly extending groove formed therein and the other of said members closing the groove to form a lubricant conducting passage, and lubricant collecting means communicating with said passage and extending within said brake drum and beyond the rear end of the wheel hub.

3. The combination with a vehicle wheel, of a brake drum secured thereto, one of said members having a groove therein and the other of said members closing the groove to form a lubricant conducting passage, means for securing said brake drum to said wheel and lubricant collecting means communicating with said passage and secured independently of said brake drum securing means, said lubricant collecting means extending within said brake drum and beyond the rear end of the wheel hub.

4. In a vehicle wheel, the combination with a hub and a hub section, of a brake drum secured to said hub section and cooperating therewith to form an outwardly extending lubricant conducting passage, and lubricant collecting means communicating with said passage and extending within said brake drum and beyond the rear end of said hub.

5. The combination with a vehicle wheel having a series of lubricant conducting passages therein, of a brake drum secured to said wheel having passages therein communicating with the passages aforesaid, and a lubricant collecting ring secured to the web of said brake drum and communicating with said passages.

6. The combination with a vehicle wheel having a lubricant conducting passage therein, of a brake drum upon said wheel having a passage therein communicating with the passage aforesaid, and lubricant collecting means communicating with said passages.

7. A vehicle wheel having a hub, a brake drum, means for securing said brake drum to said hub, and means for collecting lubricant discharged from a point adjacent the rim end of said hub and conducting the lubricant forwardly to a point outside said brake drum, said means including a ring extending within said brake drum and having the outer edge portions thereof engaging the drum radially inward of said securing means.

8. A vehicle wheel having a hub, a brake drum provided with a brake flange and a web, means extending through said web for securing said brake drum to said hub, and means for collecting lubricant discharged from a point adjacent to said hub and conducting the lubricant forwardly through said web, said means including an annular member extending within the brake drum and secured to the web aforesaid of the drum radially inward of said securing means.

9. In a vehicle wheel, the combination with a hub, of a brake drum having a web provided with an annular shoulder surrounding said hub, means spaced radially outwardly from said shoulder for securing the web of the brake drum to the hub, and means for collecting lubricant discharged from a point adjacent one end of the hub and conducting the same forwardly by centrifugal force through the web, said means including a collecting ring having a flange sleeved upon the shoulder aforesaid.

10. The combination with a vehicle wheel body having a lubricant conducting passage therein, of a brake drum upon said wheel body having an opening therein communicating with the passage aforesaid, and lubricant collecting means within the brake drum communicating with both said opening and passage.

11. A vehicle wheel having a hub, a wheel body member and a brake drum secured to the hub, means arranged within the brake drum for collecting lubricant discharged from a point adjacent the rim end of the hub, and means in said wheel body member for conducting the lubricant from said collecting means to a point outside of the brake drum.

12. In a vehicle wheel the combination with a hub, a brake drum having a web, and securing means for the brake drum including fastener elements extending through the web, of a lubricant collecting ring disposed within the drum and having the peripheral portions thereof engaging the web radially inwardly from the securing means aforesaid and secured to the web independent of said securing means, said ring extending rearwardly beyond the rear end of the hub for collecting lubricant, and means for conducting the lubricant collected by said ring to a point outside of said drum.

13. A vehicle wheel having a hub, a brake drum having a web formed with an annular groove in its rear face and a transverse opening radially inward of the radial outer wall of the groove, means for securing said brake drum to said hub, and means for collecting lubricant discharged from a point adjacent the rear end of said hub and conducting the lubricant forwardly to the opening in said web, said means comprising a ring rigidly secured in the annular groove of said web.

14. A vehicle wheel having a hub, a brake drum having a web formed with an annular groove in its rear face and a transverse opening radially inward of the radial outer wall of the groove, means for securing said brake drum to said hub, and means for collecting lubricant discharged from a point adjacent the rear end of said hub and conducting the lubricant forwardly to the opening in said web, said means comprising a frusto-conical ring having a transverse annular flange at its front edge extending within the annular groove of said web and firmly secured to said web.

In testimony whereof I affix my signature.

WILLIAM N. BOOTH.